(12) United States Patent
Bauban et al.

(10) Patent No.: US 7,721,326 B2
(45) Date of Patent: May 18, 2010

(54) AUTOMATIC AUTHENTICATION SELECTION SERVER

(75) Inventors: Patrick Bauban, Caen (FR); Philippe Michon, Bretteville sur Odon (FR)

(73) Assignee: France Telecom, Paris (FR)

( * ) Notice: Subject to any disclaimer, the term of this patent is extended or adjusted under 35 U.S.C. 154(b) by 201 days.

(21) Appl. No.: 10/566,945

(22) PCT Filed: Feb. 10, 2005

(86) PCT No.: PCT/FR2005/000320

§ 371 (c)(1),
(2), (4) Date: Jun. 28, 2006

(87) PCT Pub. No.: WO2006/084960

PCT Pub. Date: Aug. 17, 2006

(65) Prior Publication Data

US 2007/0094714 A1   Apr. 26, 2007

(51) Int. Cl.
*G06F 7/04* (2006.01)
*H04L 9/32* (2006.01)

(52) U.S. Cl. .......................... 726/5; 713/176
(58) Field of Classification Search ............ 726/5, 726/3; 713/168, 176
See application file for complete search history.

(56) References Cited

U.S. PATENT DOCUMENTS

| | | | |
|---|---|---|---|
| 6,338,139 B1 * | 1/2002 | Ando et al. ................. 713/168 |
| 6,950,935 B1 * | 9/2005 | Allavarpu et al. ........... 713/168 |
| 7,093,019 B1 * | 8/2006 | Bertani et al. ............... 709/229 |
| 7,353,542 B2 * | 4/2008 | Shiga et al. .................. 726/28 |
| 7,444,368 B1 * | 10/2008 | Wong et al. ................. 709/200 |
| 2003/0018918 A1 * | 1/2003 | Natsuno et al. ............. 713/201 |
| 2003/0033524 A1 * | 2/2003 | Tran et al. ................... 713/168 |
| 2003/0046541 A1 | 3/2003 | Gerdes et al. |
| 2003/0051147 A1 * | 3/2003 | Maeda et al. ............... 713/186 |
| 2003/0070091 A1 | 4/2003 | Loveland |
| 2003/0097593 A1 * | 5/2003 | Sawa et al. .................. 713/201 |
| 2003/0114144 A1 * | 6/2003 | Minemura ................... 455/410 |
| 2004/0139349 A1 | 7/2004 | Henn et al. |
| 2005/0135625 A1 * | 6/2005 | Tanizawa et al. ............ 380/270 |
| 2005/0193211 A1 * | 9/2005 | Kurose ........................ 713/185 |
| 2005/0289341 A1 * | 12/2005 | Ritola et al. ................. 713/168 |

(Continued)

FOREIGN PATENT DOCUMENTS

EP   1158745   11/2001

(Continued)

OTHER PUBLICATIONS

International Search Report for PCT/FR2005/000320 dated Jul. 21, 2005.

*Primary Examiner*—Techane J Gergiso
(74) *Attorney, Agent, or Firm*—Lowe Hauptman Ham & Berner LLP (57) ABSTRACT

An authentication server automatically selects one of plural authentications identified by authentication identifiers to authorize access by a user to a service dispensed by a service server of a provider identified by a provider identifier via a communication network. The server includes a module for selecting an authentication identifier in a memory as a function of the provider identifier and the type of the terminal and/or the network type of the communication network, and a module for authenticating the user by launching an authentication process associated with the authentication identifier.

9 Claims, 3 Drawing Sheets

U.S. PATENT DOCUMENTS

2007/0211892 A1 * 9/2007 Ohkoshi .................. 380/30

FOREIGN PATENT DOCUMENTS

| EP | 1288765 | 3/2003 |
| EP | 1301006 | 4/2003 |
| EP | 1158745 | 9/2003 |
| WO | 2005-015877 | 2/2005 |

* cited by examiner

AUTOMATIC AUTHENTICATION SELECTION SERVER

REFERENCE TO RELATED APPLICATION

This application is a National Phase of the PCT International Application No. PCT/FR05/000320 filed Feb. 10, 2005, the disclosure of which is hereby incorporated by reference herein in its entirety.

BACKGROUND OF THE INVENTION

1. Field of the Invention The present invention relates to a server for authenticating a user of a terminal for accessing a service delivered by a service provider via an agent by dynamically selecting an authentication procedure via a telecommunication network. To be more precise, the authentication procedure corresponds to an authentication selected as a function of at least one service provider, the terminal, the network and an authentication security level.

2. Description of the Prior Art

The many existing authentication systems differ in terms of their security levels and authentication procedures. Standard authentication by means of an identifier (also known as a login) and a password is static, that is to say the same identifier and password are transmitted over the network for successive authentications. This authentication may suffer from piracy of the password and thereby offer a low level of authentication security.

Authentication by "random number (challenge)/response" is dynamic. It is based on a principle of one-time password (OTP). There is then no point in entering a password as the password cannot be used again. When a user wishes to be authenticated by a server, the server generates a "random number", called as challenge, and sends it to the terminal of the user. The user enters the password and applies it by means of encryption and hashing algorithms. The terminal of the user transmits the OTP to the server, which then has the information necessary for authenticating the user.

Authentication based on certificates is also dynamic and uses asymmetrical public key cryptographic algorithms. A certificate comprises a user identity, a public key and a private key that are certified by a certification authority. The private key is kept secret by the user and stored in the terminal of the user. A password entered or spoken, a biometric imprint or a confidential code may be necessary to activate the private key. In practice, after activation of the private key, a server transmits a challenge to the user terminal. The user terminal signs the challenge with the user's corresponding private key and transmits it to the server. The server then authenticates the user using the user's public key. For example, authentication by electronic signature is based on certificates.

As authentication, procedures are generally complex and constraining to put into place, a service provider agent can provide, in a transparent way, user authentication procedures on behalf of his clients, known as "providers". For example, a provider offering a real time information service on the internet uses an agent to manage all aspects of the user authentication procedure. The authentication procedures of the agent are generally identical throughout the network for all providers that are clients of the agent. Moreover, a provider cannot easily modify the authentication procedure of his choice as a function of the combination of the terminal (mobile, PC, TV, PDA) and the telecommunication network (GPRS, internet) used by users.

OBJECT OF THE INVENTION

An object of the present invention is to remedy the drawbacks cited above by automatically selecting an authentication as a function of the provider and characteristics of a user terminal and a telecommunication network.

SUMMARY OF THE INVENTION

Accordingly, an authentication server for automatically selecting one of a plurality of authentications identified respectively by authentication identifiers in order to authenticate a user of a terminal in order to authorize the user to access a service dispensed by a service server of a provider identified by a provider identifier via a communication network, is characterized in that it comprises:

means for selecting an authentication identifier in a memory as a function of the provider identifier and the type of the terminal and/or of the type of the communication network, and means for authenticating the user by means of an authentication process associated with the authentication identifier.

The selecting means can also select the authentication identifier as a function of an authentication security level in corresponding relationship to the provider identifier, and/or as a function of authentication rules associated with the provider identifier and applied to at least an authentication security level corresponding to the provider identifier and/or to the terminal type and/or to the communication network type.

In a first embodiment, if the user wishes to use a service offered by the service server, a connection is set up between the user terminal and the service server, which requests the selecting means to authenticate the user. In this first embodiment, the service server comprises means for transmitting at least the provider identifier and the terminal type and/or the communication network type to the selecting means in response to a connection set up between the user terminal and the service server, in response to the connection that has been set up cited above.

In a second embodiment, if the user wishes to use a service in the service server, a connection is set up between the user terminal and the selecting means. In this latter embodiment, the selecting means transmits to the terminal a list of services identified by service identifiers in response to in response to the set-up above-cited connection, and the terminal transmits to the selecting means a service identifier of a service selected by the user in the transmitted list in order for the selecting means to select the authentication identifier as a function also of the selected service identifier. According to an alternative of the second embodiment which can be combined thereto, the selecting means transmits to the terminal a list of provider identifiers in response to a connection set up between the user terminal and the selecting means, and the terminal transmits to the selecting means a provider identifier (selected by the user in the transmitted list in order for the selecting means to select the authentication identifier as a function in particular of the selected provider identifier.

The invention concerns also a method for automatically selecting one of a plurality of authentications identified respectively by authentication identifiers in order to authenticate a user of a terminal to authorize the user to access a service dispensed by a service server of a provider identified by a provider identifier via a communication network. The method is characterized in that it comprises the steps of:

selecting an authentication identifier in a memory as a function of the provider identifier and the type of the terminal and/or the type of the communication network, and authenticating the user by an authentication process associated with the authentication identifier.

BRIEF DESCRIPTION OF THE DRAWINGS

Other features and advantages of the present invention will become more clearly apparent on reading the following description of preferred embodiments of the invention, given by way of nonlimiting examples and with reference to the corresponding appended drawings, in which.

DETAILED DESCRIPTION OF THE DRAWINGS

In the embodiments of the invention, the automatic authentication selection system relies on exchanges of information between an agent, a service provider and a user.

Figure 1:
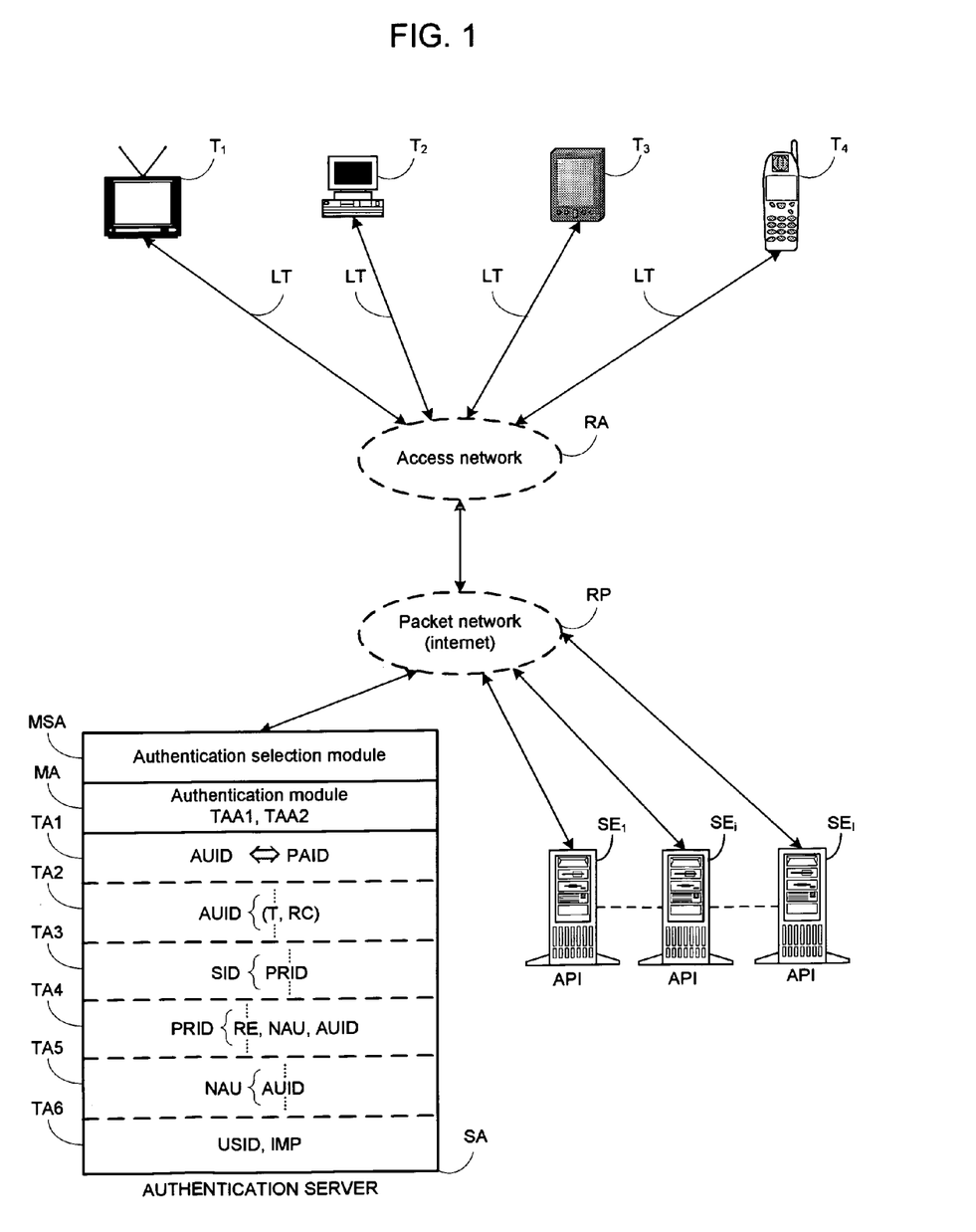
FIG. 1 is a schematic block-diagram of an automatic authentication selection system according to the invention.

The automatic authentication selection system of the invention is based on a client-server architecture. Referring to FIG. 1, it comprises primarily a plurality of interactive user terminals T, at least one authentication server SA constituting the agent, and at least one service server SE constituting the provider.

A user accesses via his interactive terminal services necessitating user authentication. In the embodiment shown in FIG. 1, a user terminal $T_1$ is an intelligent television receiver, for example. The television receiver $T_1$ cooperates with a remote control that incorporates a display and an alphanumeric keypad and also serves as a mouse via an infrared link. Alternatively, the remote control is associated with a more comprehensive wireless keyboard connected to the television by a short-range radio link.

Other portable or non-portable domestic terminals may also be envisaged, such as a microcomputer, telephone, video games console, radio, alarm system, etc. The terminal T is served by a telecommunication link LT and an access network RA, such as a telephone line and the public switched telephone network, which connect it to an internet type high data rate packet transmission network RP to which the authentication server SA is connected.

To give another example, the user terminal $T_2$ is a personal computer connected directly by a modem to the link LT and preferably including at least one loudspeaker. To give further examples, the user terminal $T_3$ comprises an electronic telecommunication device or object personal to the user, which may be a personal digital assistant (PDA), or an intelligent radio receiver instead of the television receiver $T_1$; both types of receiver may co-exist.

The telecommunication link LT may be a digital subscriber line (xDSL) or an integrated services digital network (ISDN) line connected to the corresponding access network.

To give a further example, the terminal $T_4$ is a cellular mobile radio telephone terminal, the telecommunication link LT is a radio channel, and the access network RA is the fixed network of a radio telephone network, for example of GSM (Global System for Mobile communications) or UMTS (Universal Mobile Telecommunication System) type.

The user terminals and the access networks are not limited to the above examples shown in FIG. 1 and may consist of other terminals and other access networks known in the art.

The authentication server SA comprises an authentication selection module MSA, an authentication module MA and at least one memory holding six tables of correspondences TA1 to TA6. The authentication server is associated with an agent.

In one variant, the authentication server SA comprises two separate servers respectively including the authentication selection module MSA and the authentication module MA. For example, the module MA is in any kind of HTTP server connected to the telecommunication network RC and therefore to the packet network RP, and thus communicates with the server SA including the module MSA.

The first table TA1 defines the correspondence between an authentication identifier AUID and an authentication process identifier PAID. Authentication generally designates a set of parameters, such as a login, a password and user characteristics, and a set of authentication processes using that set of parameters. An authentication process defines successive steps of an authentication identified by the authentication identifier AUID.

The second table TA2 defines the correspondence between the authentication identifier AUID of each authentication and at least one type of terminal T and/or one type of communication network RC able to support the identified authentication. Authentication processes differ according to the type of the terminal T and/or the type of the communication network RC over which messages are exchanged between the terminal and the server SE or SA in first and second embodiments of the method described later.

The communication network RC is defined by a specific set of lines and equipment necessary for transmission of data. For example, a Short Message Service (SMS) network is a communication network similar to a portion of the GSM network that is re-used to transfer short messages and dedicated equipment such as a short message server. A voice network consisting of a Voice extensible Markup Language (VXML) voice platform, application servers and a portion of the mobile telephone or switched telephone network is another communication network. Other examples of a communication network of the invention are GSM, UMTS, Wireless Application Protocol (WAP), Unstructured Supplementary Services Data (USSD) networks, the internet, etc.

The third table TA3 associates at least one service identifier SID with at least one service provider identifier PRID, that is to say an identifier PRID of a service server SE dispensing a service identified by the identifier SID. A service may be associated with one or more providers and a provider may be associated with one or more services. For simplicity, the term "provider" may equally designate a service managed by the provider or even a service server managed by the provider.

The fourth table TA4 defines the correspondence between a provider identifier PRID or an authentication rule RE and an authentication security level NAU authorized by the provider identified by the provider identifier or an authentication identifier AUID. The authentication rules define an action to be executed if multiple authentication security levels are authorized by a provider and/or if the types of terminal T and communication network RC identified support a plurality of authentication processes having an authorized authentication security level, for example.

The fifth table TA5 associates at least one authentication identifier AUID with each authentication security level NAU.

The sixth table TA6 contains user identifiers USID of users that each have access to at least one prohibited combination of a provider identifier and a service identifier (PRID, SID), and where applicable defines the correspondence between the identifier USID of a user and respective information IMP providing reasons for prohibiting that user to use the service. For example, information IMP indicates failures of the user to make a payment. In conjunction with the table TA3, the table TA6 defines the correspondence between a user identifier USID and at least one combination of a provider identifier PRID and a service identifier SID.

The authentication module MA comprises a programmable read-only memory of PROM type that includes a plurality of authentication processes (algorithms) designated by identifiers PAID and a user database comprising two memory tables TAA1 and TAA2. The table TAA1 associates the identifier USID of each user with personal information on the user, such as a name, forename, password, login, etc., and the table TAA2 associates the identifier USID of a user with a combination of a provider identifier PRID and a service identifier SID.

The automatic authentication selection system of the invention preferably comprises a plurality of service servers $SE_1$ to $SE_I$ shown in FIG. 1. A service server is of the standard HTTP server type and includes at least one application dispensing at least one service to a plurality of users via the terminals T. At least a service server SE is associated with a service provider offering users at least one service. The nature of the service is of little importance for the invention. For example, one such service is consultation of bank account details or reception of stock market news. A programming tool such as an application-programming interface (API) is installed on each service server SE. This tool ensures exchange of formatted data between one of the service applications implemented in one of the service servers SE and the authentication server SA.

Figure 2:
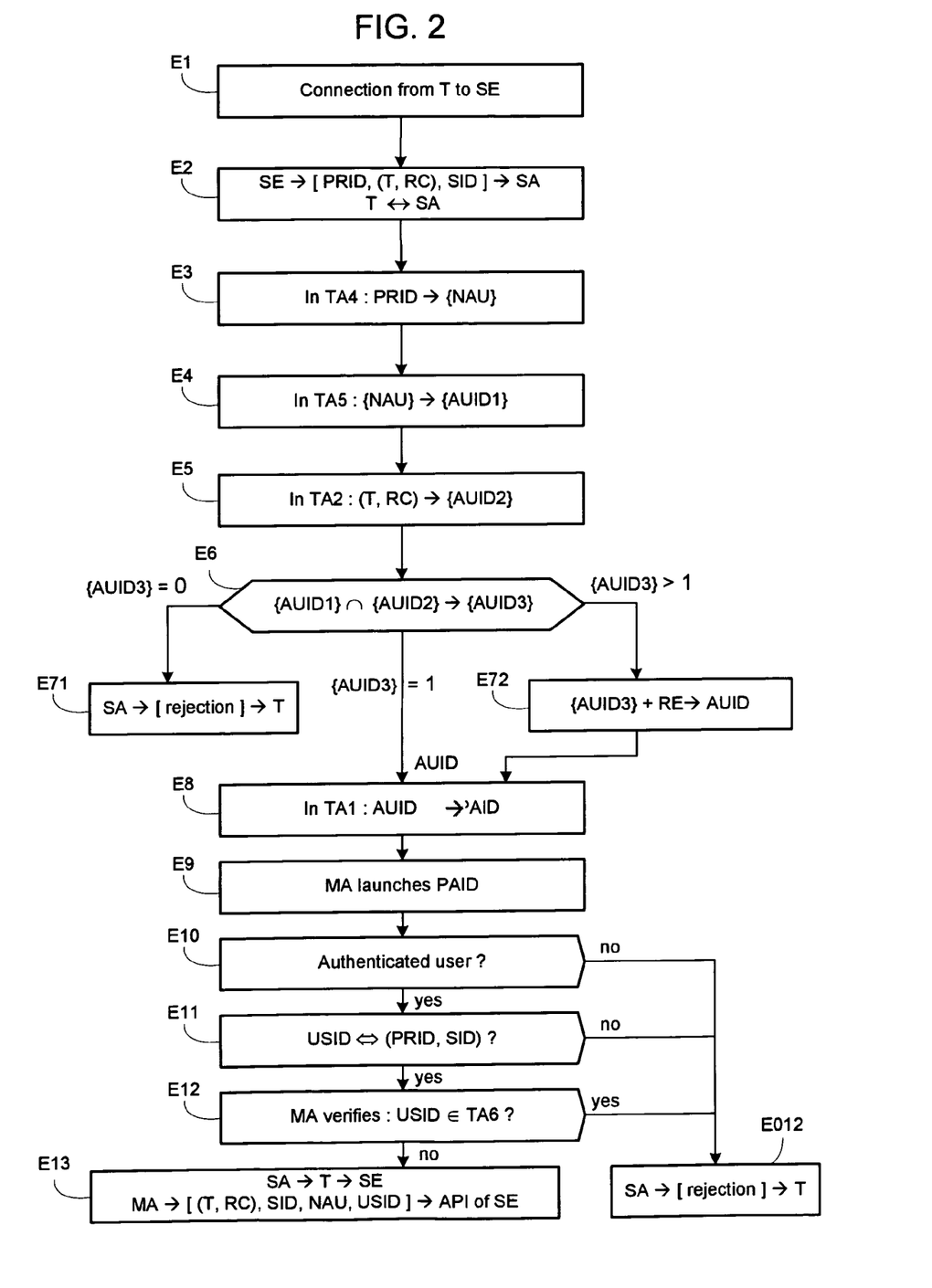
FIG. 2 is a schematic algorithm of an authentication selection method used in a first embodiment of an automatic authentication selection system of the invention.

A first embodiment shown in FIG. 2 of an authentication selection method comprises primarily steps E1 to E13. In the step E1, a user terminal T requests a connection to one of the service servers SE to send it a service access request.

In response to the connection set up between the user terminal and the service server SE, in the step E2 the programming tool API installed in the service server SE sets up a connection with the authentication server SA to transmit to the authentication selection module MSA the provider identifier PRID, the terminal type of the terminal T and the network type of the communication network RC, as well as service identifiers SID if the provider managing the server SE offers more than one service. The service server SE redirects the connection with the user terminal T to the authentication server SA, transmitting the uniform resource locator (URL) of the server SE to the terminal T. The user terminal T is then redirected to the authentication server SA.

The authentication selection module MSA selects an authentication identifier AUID from a memory table (TA1 to TA6) additionally as a function of the provider identifier PRID and the terminal type of the terminal T and/or the network type of the communication network RC that it has transmitted, in order for the authentication module MA subsequently to launch an authentication process associated with the authentication identifier AUID selected in the user terminal T.

In the step E3, the authentication selection module MSA in the authentication server SA selects in the table TA4 an authentication security level NAU corresponding to the identifier PRID of the provider that has been transmitted. The authentication security level also contributes to the selection of the authentication identifier AUID. Alternatively, if more than one authentication security level is determined in the step E3, the authentication rules RE associated with the provider identifier PRID in the table TA4 lead to the selection of a single authentication level NAU and thus contribute to the selection of the authentication identifier AUID. For example, one authentication rule is: "always select the highest authentication security level".

Then, in the step E4, the selection module MSA selects in the table TA5 an authentication identifier AUID1 corresponding to the authentication security level(s) NAU selected in the step E3.

In the step E5, the selection module MSA selects in the table TA2 an authentication identifier AUID2 corresponding to the terminal type and/or to the communication network type transmitted by the server SE. The step E5 can be executed either before or after the step E3.

In the step E6, the selection module MSA determines authentication identifiers AUID3 common to the authentication identifiers AUID1 and AUID2 selected in the steps E4 and E5. If there is no common authentication identifier, a rejection message reporting rejection of access to the service requested by the user is transmitted by the authentication server SA to the user terminal T in a step E71. If there is more than one common authentication identifier AUID3, the authentication rules RE associated with the provider identifier PRID lead to selecting only one authentication identifier AUID in a step E72.

The authentication selection module having selected the identifier AUID of the authentication, in the step E8 the authentication module MA in the authentication server SA selects in the table TA1 an authentication process identifier PAID corresponding to the authentication identifier AUID. In the step E9 the authentication module MA launches the authentication process identified by the selected process identifier PAID. The authentication process defines steps that constitute the associated authentication. For example, if the authentication selected is a standard authentication by means of a login and a password, and one of the steps of the authentication process is the authentication server SA transmitting a request to enter the login and the password to the user terminal T.

If the user is not authenticated in the step E10, the authentication module MA of the authentication server SA transmits a rejection message to the terminal in a step E012.

An authenticated user is therefore a user whose identifier USID is included in the memory table TAA1 of the authentication module MA.

If the user is authenticated, the authentication module MA verifies in the table TAA2 if the user has a subscription to the provider/service pair in a step E11, i.e. if the user identifier USID is associated with the combination of the selected provider identifier and the selected service identifier (PRID, SID) in the table TAA2. If the user has no subscription to that provider/service combination, the authentication module MA transmits a rejection message to the terminal in the step E012.

If the user has been authenticated and has a subscription to the provider/service combination, in the step E12 the authentication module MA verifies in the table TA6 whether the user is prohibited from accessing the combination (PRID, SID) comprising the provider identifier and the service identifier. If such access is prohibited, the authentication module transmits a rejection message to the terminal in the step E012.

If such access is not prohibited, and thus following positive authentication of the user, the authentication module MA in the authentication server SA controls redirection of the connection with the terminal T to the service server SE. In the step E13 the module MA in the server SA also controls transmitting of the terminal type, the communication network type, the service identifier SID, the authentication security level NAU selected or designated by the authentication identifier AUID, and where applicable the user identifier USID and/or a billing ticket and/or a user authentication result, which here is positive, to the service server SE, more particularly to the programming tool API of the service server. Transmitting the service identifier SID is beneficial if the service server SE dispenses more than one service.

In practice, the authentication module MA stores the user authentication result in order to retain a record of authentication in the event of any dispute between the user of the terminal T and the provider managing the service server SE.

Alternatively, at least the steps E11 and/or E12 precede the authentication steps E8, E9 and E10.

In a main variant of the first embodiment, in the step E3 the authentication selection module MSA in the authentication server SA selects in the table TA4 all the authentication identifiers AUID associated with the provider identifier PRID transmitted by the service server SE instead of selecting an authentication security level NAU. In this variant, the step E4 is eliminated. In the step E5, the selection module MSA selects in the table TA2 an authentication identifier AUID2 corresponding to the terminal type of the terminal T and/or the communication network RC transmitted by the server SE. In the step E6, the selection module determines authentication identifiers common to those resulting from the selections effected in the steps E3 and E5. If the selection module does not determine a common authentication identifier, in the step E71 the authentication server SA transmits a rejection message to the user terminal T. If there is more than one common authentication identifier, the authentication rules RE associated with the provider identifier PRID enable selection of only one authentication identifier AUID in the step E72. The subsequent steps are identical to those of the first embodiment.

The provider may set a parameter of the programming tool API in order to select between an authentication security level mode corresponding to the first embodiment and an authentication mode corresponding to the above variant. The tool API transmits this parameter to the authentication server SA in the step E2. This parameter may be associated beforehand with the provider identifier PRID in the table TA4.

Figure 3:
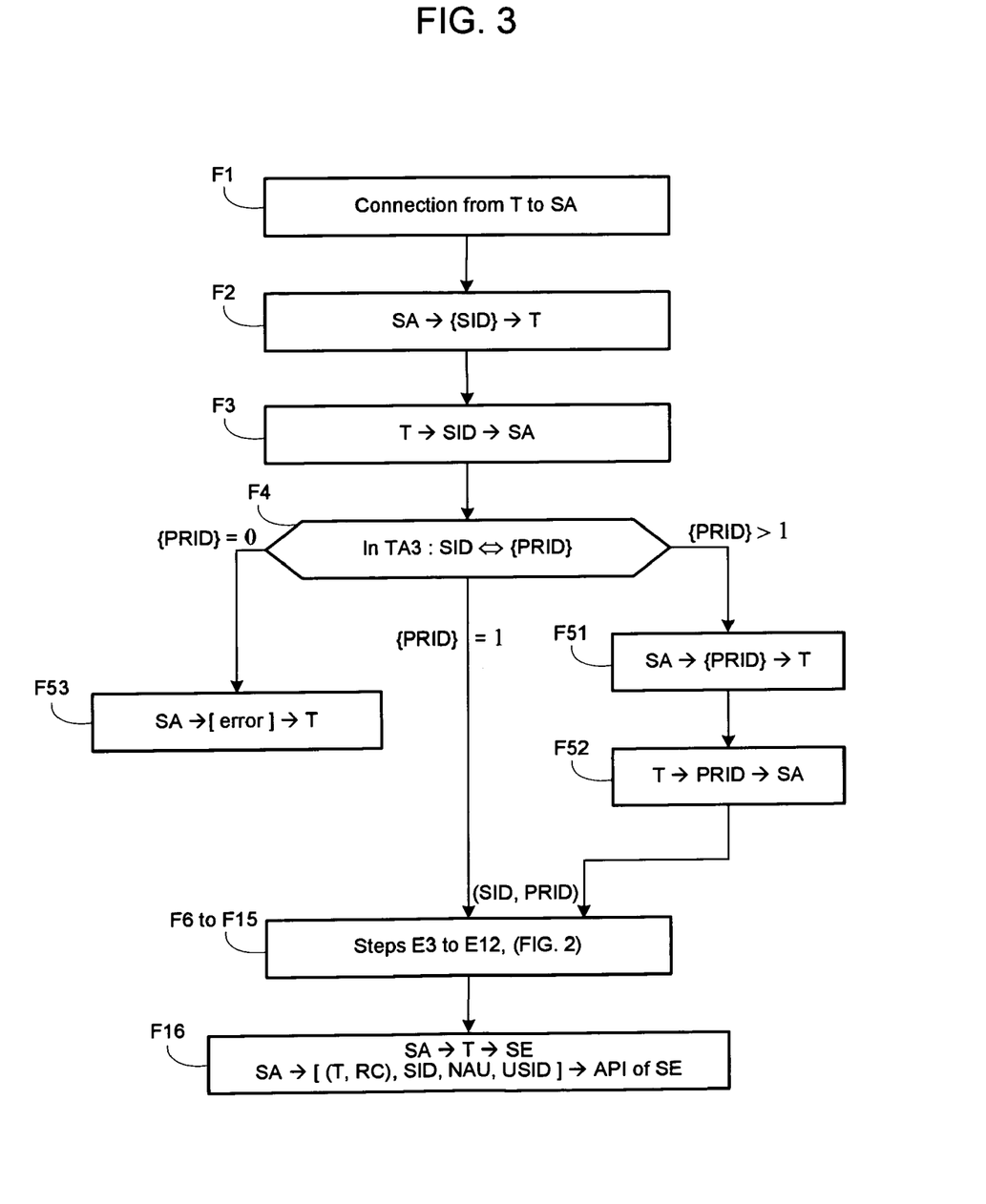
FIG. 3 is a schematic algorithm of an authentication selection method used in a second embodiment of an automatic authentication selection system of the invention.

A second embodiment of the authentication selection method comprises primarily the steps F1 to F16 shown in FIG. 3. In the step F1 the terminal requests a direct connection with the authentication selection module MSA in the authentication server SA.

In the step F2, in response to the connection set up between the user terminal T and the selection module MSA, the authentication server SA, or to be more precise the authentication selection module MSA, transmits a list {SID} of services included in the table TA3 to the terminal T. The list {SID} of various services includes the identifiers SID of the services and, in one variant, other characteristics such as a name and a description of each service. The user of the terminal T selects a service from the list {SID} of services. In the step F3 the terminal T transmits to the selection module MSA the service identifier SID associated with the service selected by the user in the list that was transmitted. The authentication selection module selects the authentication identifier AUID as a function also of the selected service identifier SID.

In the step F4, the authentication server SA selects in the table TA3 all the provider identifiers corresponding to the selected service identifier SID in the form of a list {PRID} of provider identifiers.

If the list of provider identifiers comprises more than one provider identifier PRID corresponding to the selected service identifier SID, in a step F51 the authentication server SA transmits to the user terminal T the list {PRID} of the identifiers of providers able to offer the service identified by the service identifier SID. This list {PRID} of provider identifiers includes the identifiers of those providers and, in one variant, other characteristics such as a name and a description of each provider. The terminal user selects a provider and the terminal then transmits the identifier PRID of the provider selected by the user to the authentication server SA in a step F52.

If there is no provider identifier that corresponds to the service identifier SID, the authentication server SA transmits an error message to the terminal T in a step F53, in order to notify the terminal user that there is as yet no provider delivering the service in question.

In a variant, in the step F2, the authentication server SA transmits a list of all the provider identifiers included in the table TA4 directly to the terminal T, instead of the list of service providers. The user selects a provider directly, and the terminal T then transmits the selected provider identifier PRID, rather than the selected service identifier SID, to the authentication selection module MSA of the authentication server SA in the step F3. The authentication selection module MSA selects the authentication identifier AUID as a function of the selected provider identifier PRID in particular.

If there are plural service identifiers corresponding to the provider identifier PRID previously selected, the authentication server transmits each provider identifier and the associated list of service identifiers to the terminal in the step F2. The terminal user selects the provider and one of the services offered by the selected provider, after which the terminal T transmits to the authentication server SA the identifier PRID of the provider and the identifier SID of the service selected by the terminal user in the step F3.

In this variant, the steps F4, F51, F52 and F53 are eliminated.

The authentication server SA then has in its memory the combination (SID, PRID) comprising the provider identifier and the service identifier corresponding to the user's request.

The subsequent steps F6 to F15 correspond respectively to the steps E3 to E12 of the first embodiment of the selection method, shown in FIG. 2.

In the step F8 corresponding to the step E5, the authentication server SA determines the type of terminal and the type of communication network RC used for communication between the terminal T and the authentication server SA. The latter then selects an authentication identifier AUID2 as a function of the terminal type of the terminal T and/or the network type of the communication network RC, as described for the step E5.

If the user has been authenticated, has a subscription to the provider/service combination, and is authorized to access the provider/service combination, the authentication server SA redirects the connection with the terminal T to the service server SE and in the step F16 transmits to the service server SE, and more particularly to the tool API of the service server SE, the type of terminal, the type of communication network, the service identifier SID, the selected authentication security level NAU, and where applicable the user identifier USID and/or a billing ticket and/or the result of the authentication, which is positive.

If the result of authenticating the user is positive and has been transmitted or, more simply, if the terminal type, the communication network type, the service identifier and the authentication security level have been transmitted, the service server SE authorizes the user terminal to access the service requested by the user and identified by the service identifier SID. In other cases, access is refused to the user as indicated in the step E012.

The terminal type of the terminal T and the network type of the communication network RC are transmitted in order for the service server SE to be able to adapt the communication to the terminal. For example, if the terminal is a cellular mobile telephone and the protocol for communication therewith via the internet is of the WAP type, the service server SE communicates with the terminal using the Wireless Markup Language (WML).

In a variant of the second embodiment, after the step F1 and before the step F2, the user of the terminal T himself selects an authentication security level NAU from a plurality of security levels known beforehand. In response to the selected identifier NAU transmitted by the terminal to the authentication server SA, the latter transmits service identifiers SID corresponding to the authentication level selected by the user in the step F2. The user selects the service, after which the terminal transmits the service identifier SID to the authentication server SA, in the step F3. Then in the subsequent steps F4 to F16, the step F6 corresponding to the step E3 is eliminated.

Alternatively, when in the first and second embodiments the authentication server SA transmits the user identifier USID, the authentication server may also transmit other user parameters such as the name, forename, etc.

The main variant of the first embodiment may be applied in the context of the second embodiment.

The invention described here relates to an authentication selection method and an authentication selection server. In a preferred embodiment, the steps of the method are determined by instructions of an authentication selection program incorporated into an authentication server SA, and the method of the invention is performed when this program is loaded into a computer whose operation is then controlled by the execution of the program.

Consequently, the invention applies equally to a computer program adapted to implement the invention, in particular a computer program on or in an information medium. This program may use any programming language and be in the form of source code, object code, or an intermediate code between source code and intermediate code, such as in a partially compiled form, or in any other form suitable for implementing a method of the invention.

The information medium may be any entity or device capable of storing the program. For example, the medium may include storage means, such as a ROM, for example a CD-ROM or a microelectronic circuit ROM, or magnetic storage means, for example a diskette (floppy disk) or a hard disk.

Moreover, the information medium may be a transmissible medium such as an electrical or optical signal, which may be routed via an electrical or optical cable, by radio or by other means. The program of the invention may in particular be downloaded over an internet type network.

Alternatively, the information medium may be an integrated circuit in which the program is incorporated, the circuit being adapted to execute or to be used in the execution of the method of the invention.

The invention claimed is:

1. A system for authenticating a user, the system comprising:
   a terminal,
   an authentication server for automatically selecting one of a plurality of authentications identified respectively by authentication identifiers in order to authenticate said user of said terminal in order to authorize said user to access a service dispensed by one of service servers of providers identified respectively by provider identifiers via a communication network,
   a memory for storing correspondences between authentication identifiers, provider identifiers, types of terminal and types of communication network,
   a reception arrangement for receiving from said terminal a provider identifier selected in said terminal in response to a connection set up between said user terminal and said authentication server without any prior connection between said user terminal and one of said service servers,
   a selector arrangement for selecting an authentication identifier in said memory as a function of said selected provider identifier and the type of at least one of said terminal and said communication network,
   an authenticator arrangement for authenticating said user by using an authentication associated with said selected authentication identifier,
   a redirection arrangement for redirecting said connection with said terminal to a service server corresponding to said selected provider identifier if said user has been authenticated,
   wherein said selector arrangement is arranged to transmit to said terminal a list of services identified by service identifiers in said memory in response to said connection set up between said user terminal and said authentication server, and said user terminal is arranged to transmit to said selector arrangement a service identifier of a service selected by said user in the transmitted list in order for said selector arrangement to select said authentication identifier in said memory as a function of said selected service identifier, and
   wherein said selector arrangement is arranged to transmit to said terminal a list of provider identifiers read in said memory in response to said connection set up between said user terminal and said authentication server, and said user terminal is arranged to transmit to said selector arrangement a provider identifier selected by said user in the transmitted list in order for said selector arrangement to select said authentication identifier as a function of said selected provider identifier.

2. The system according to claim 1, wherein said selector arrangement is arranged to select said authentication identifier in said memory as a function of an authentication security level in corresponding relationship to said selected provider identifier.

3. The system according to claim 1, wherein said selector arrangement is arranged to select said authentication identifier in said memory as a function of authentication rules associated with said selected provider identifier and applied to at least an authentication security level corresponding to at least one of said selected provider identifier and said terminal type and said communication network type.

4. The system according to claim 1, wherein, if said user has been authenticated, the authenticator arrangement is arranged to transmit to said service server said terminal type, said communication network type, said transmitted service identifier, and a security level of the authentication read in said memory and associated with said selected authentication identifier.

5. The system according to claim 1, further comprising two separate servers respectively including said selector arrangement and said authenticator arrangement.

6. The system according to claim 1, wherein there is no connection between the user terminal and the service server during receiving from said terminal a provider identifier, selecting an authentication identifier, and authenticating said user.

7. A method for authenticating a user in an authentication server, the method comprising:
  selecting one of a plurality of authentications identified respectively by authentication identifiers in order to authenticate said user of a terminal to authorize said user to access a service dispensed by one of service servers of providers identified respectively by provider identifiers via a communication network,
  storing in a memory correspondences between authentication identifiers, provider identifiers, types of terminal and types of communication network,
  receiving from said terminal a provider identifier selected in said terminal in response to a connection set up between said user terminal and said authentication server without any prior connection between said user terminal and one of said service servers,
  selecting an authentication identifier in said memory as a function of said selected provider identifier and the type of at least one of said terminal and said communication network,
  authenticating said user by an authentication associated with said selected authentication identifier,
  redirecting said connection with said terminal to a service server corresponding to said selected provider identifier if said user has been authenticated,
  transmitting to said terminal a list of services identified by service identifiers in said memory in response to said connection set up between said user terminal and said authentication server, and said user terminal is arranged to transmit to a selector arrangement a service identifier of a service selected by said user in the transmitted list in order for said selector arrangement to select said authentication identifier in said memory as a function of said selected service identifier, and
  transmitting to said terminal a list of provider identifiers read in said memory in response to said connection set up between said user terminal and said authentication server, and said user terminal is arranged to transmit to a selector arrangement a provider identifier selected by said user in the transmitted list in order for said selector arrangement to select said authentication identifier as a function of said selected provider identifier.

8. The method according to claim 7, wherein there is no connection between the user terminal and the service server during the receiving, selecting, and authenticating steps.

9. A computer readable storage medium device loaded with executable program by an authentication server, comprising:
  computer readable coded indicia representing said program for the authentication server to automatically select one of a plurality of authentications respectively identified by authentication identifiers in order to authenticate a user of a terminal in order to authorize said user to access a service dispensed by one of service servers of providers identified respectively by provider identifiers via a communication network, said program including program instructions for the authentication server to:
  store in a memory correspondences between authentication identifiers, provider identifiers, types of terminal and types of communication network,
  receive from said terminal a provider identifier selected in said terminal in response to a connection set up between said user terminal and said authentication server without any prior connection between said user terminal and one of said service servers,
  select an authentication identifier in said memory as a function of said selected provider identifier and the type of at least one of said terminal and said communication network, authenticate said user by an authentication associated with said authentication identifier,
  redirect said connection with said terminal to a service server corresponding to said selected provider identifier if said user has been authenticated,
  transmit to said terminal a list of services identified by service identifiers in said memory in response to said connection set up between said user terminal and said authentication server, and said user terminal is arranged to transmit to a selector arrangement a service identifier of a service selected by said user in the transmitted list in order for said selector arrangement to select said authentication identifier in said memory as a function of said selected service identifier, and
  transmit to said terminal a list of provider identifiers read in said memory in response to said connection set up between said user terminal and said authentication server, and said user terminal is arranged to transmit to a selector arrangement a provider identifier selected by said user in the transmitted list in order for said selector arrangement to select said authentication identifier as a function of said selected provider identifier.

* * * * *